Feb. 4, 1936.  E. ZINDEL  2,029,692
FIREARM EQUIPMENT FOR AIRCRAFT
Filed Feb. 23, 1933   4 Sheets-Sheet 1
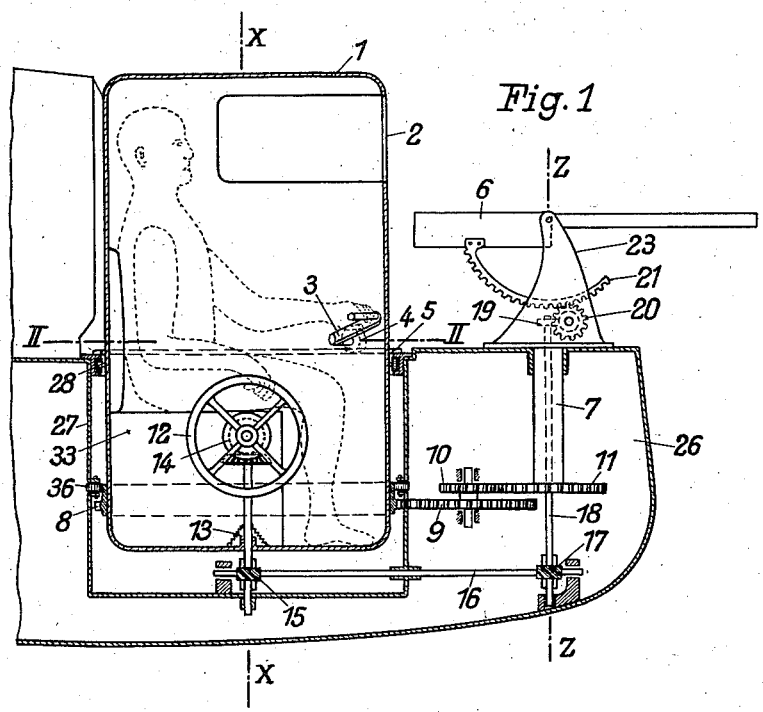
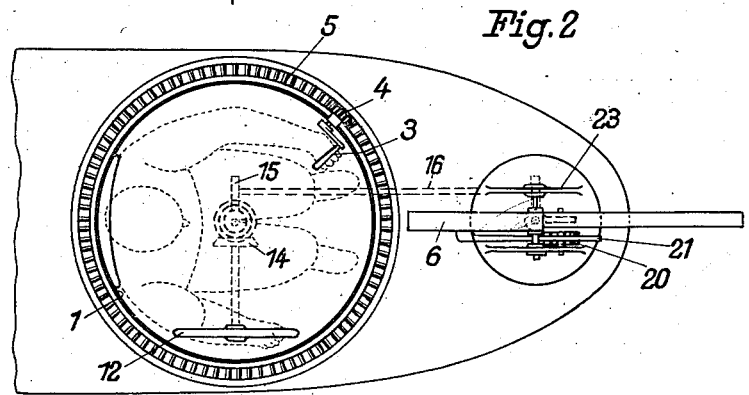
Inventor:
Ernst Zindel Feb. 4, 1936.  E. ZINDEL  2,029,692
FIREARM EQUIPMENT FOR AIRCRAFT
Filed Feb. 23, 1933 4 Sheets-Sheet 2
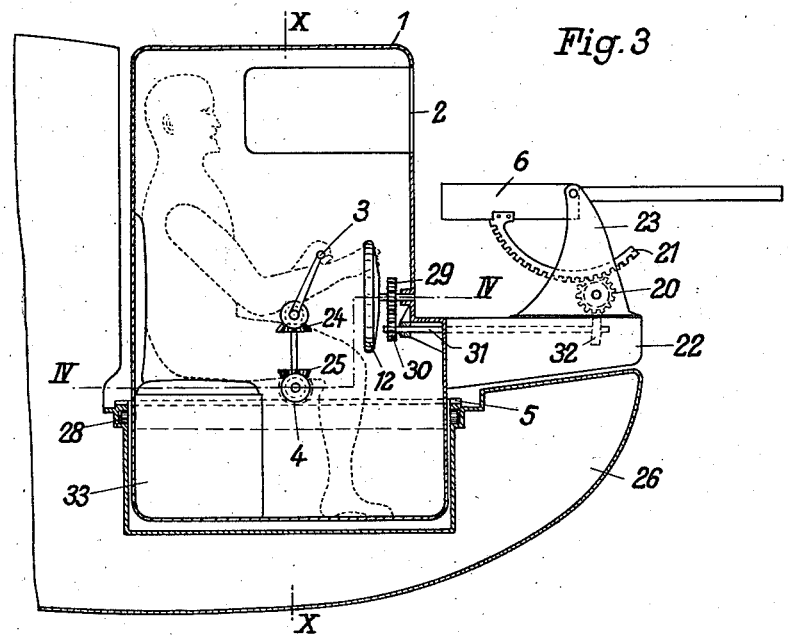
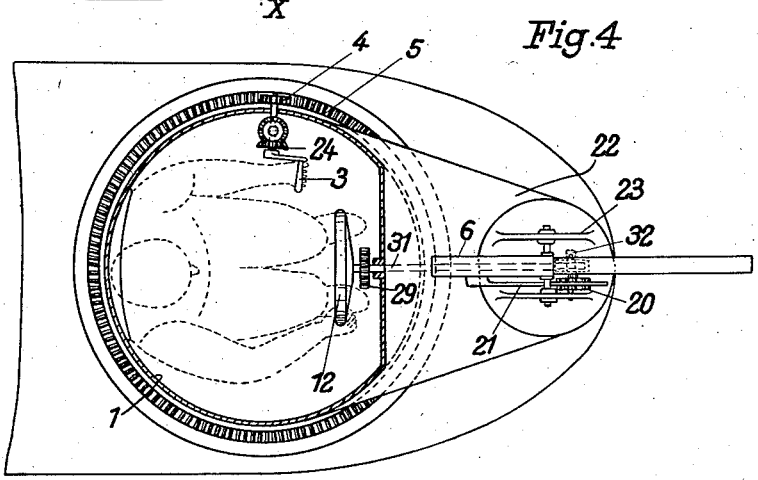
Inventor:
Ernst Zindel

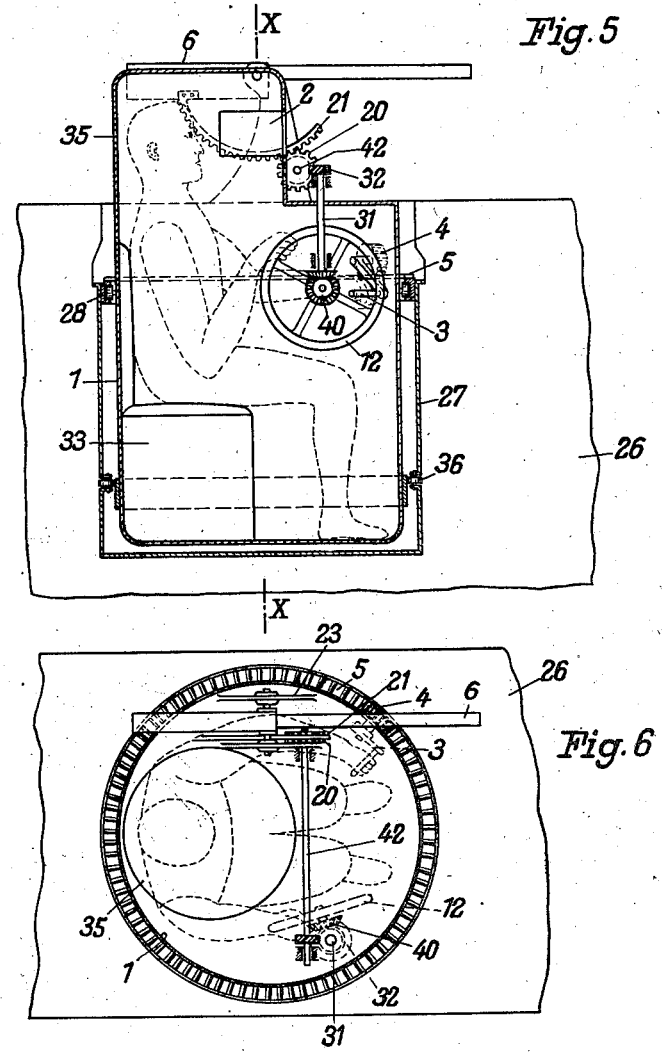

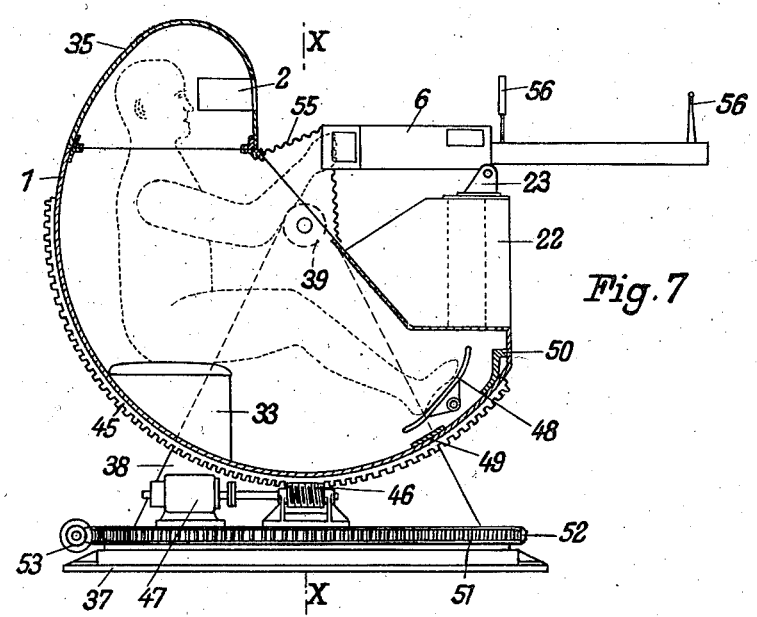
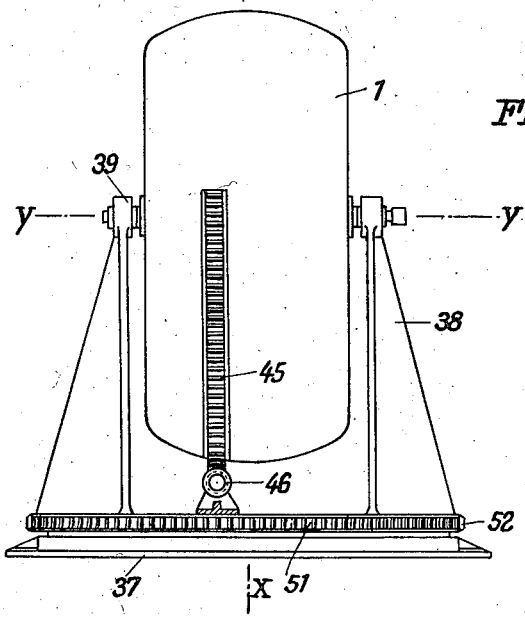

Patented Feb. 4, 1936

2,029,692

UNITED STATES PATENT OFFICE 2,029,692

FIREARM EQUIPMENT FOR AIRCRAFT

Ernst Zindel, Dessau, Germany

Application February 23, 1933, Serial No. 658,164
In Germany February 29, 1932

10 Claims. (Cl. 89—37)

My invention relates to aircraft, and more particularly to the equipment of aircraft for high altitudes with fire arms. Such aircraft is provided with an air-tight cabin for the crew and it is an object of my invention to provide means whereby fire arms are operated from such cabin without leakage of air therefrom.

To this end, in combination with an air-tight cabin for the accommodation of a marksman or gunner, or a gun crew, I provide a fire arm outside the cabin, for instance a machine gun, and means adapted to be actuated by the marksman or crew from within the cabin for operating the arm.

If the gun is arranged within the air-tight cabin, which is the most convenient arrangement with respect to its operation, it is difficult to avoid leakage and equalization of pressures through the gun. The gun itself is not easily packed against leakage, as the breech block, the means for supplying and ejecting cartridges, etc., require many packings some of which are hard to keep permanently tight.

This drawback is eliminated according to my invention by arranging the fire arm altogether outside the air-tight cabin and providing means for operating it from within the cabin. The operating means may be of any suitable kind, such as mechanical means, links, shafts or the like or they may be hydraulic or electric means. The links etc. of mechanical, or the conduits of hydraulic or electric means extend air-tightly through the wall of the cabin. The arm is preferably pointed by seating the gunner in a movable cabin, for instance a cabin which is mounted to oscillate about a vertical and/or horizontal axis, and transmitting this movement to the gun. The gun may be mounted on the aircraft, for instance on the fuselage of an airplane, or it may be mounted on a bracket which moves with the cabin, or directly on the cabin. In the two last-mentioned cases, pointing of the gun is effected directly by turning the cabin about its vertical or horizontal axis, or about both axes.

Another possibility of pointing the gun is to arrange the gun outside the cabin but with its trigger or the like within reach of the gunner, and packing the parts to be operated by the gunner air-tightly against the cabin.

In the drawings affixed to this specification and forming part thereof, several arrangements of air-tight cabins and firearms to be operated from within the cabin are illustrated diagrammatically by way of example.

In the drawings

Fig. 1 is a sectional elevation of the front end of a fuselage or nacelle equipped with an air-tight cabin mounted to turn about a vertical axis, and a machine gun mounted on the fuselage or nacelle, Fig. 2 is a section on the line II—II in Fig. 1, Fig. 3 is a sectional elevation showing a cabin resembling the one illustrated in Figs. 1 and 2, but equipped with a bracket for the machine gun, Fig. 4 is a section on the line IV—IV in Fig. 3, Fig. 5 is a sectional elevation showing a cabin which is mounted to turn about a vertical axis but has a reduced portion or top member, with the machine gun mounted on the cabin at one side of the top member, Fig. 6 is a plan view of Fig. 5, Fig. 7 is a sectional elevation of a cabin which is mounted to turn about a horizontal and a vertical axis, with the gun mounted on a bracket and equipped with a sight, Fig. 8 is an end elevation of the cabin, viewed from the rear.

Referring to the drawings and first to Figs. 1 and 2, 26 is a part of an aircraft, for instance the front end of a fuselage or a nacelle, 1 is an air-tight cabin for the accommodation of a gunner who is shown in dotted lines, 27 is a cockpit or frame in the fuselage for the reception of the lower portion of the cabin 1, 28 is an upper and 36 is a lower bearing for the cabin. Both bearings are preferably equipped with anti-friction means such as rollers. 6 is the firearm here shown as a machine gun, and 23 is its mount which is mounted to turn about an axis z—z on the top of the fuselage 26 in front of the cabin 1.

The cabin 1 which is mounted to turn in its bearings 28, 36 about the vertical axis $x$—$x$ is equipped with a window 2 through which the gunner views the object to be hit. For turning the cabin 1 about the axis $x$—$x$ a crank 3 is provided within easy reach of the gunner seated on his seat 33. The shaft of the crank extends through the wall of the cabin 1 in which it is suitably packed, 4 is a pinion on the outer end of the crank shaft, and 5 is a circular rack on the upper bearing 28 in which the pinion 4 engages. By rotating the crank the gunner turns the cabin about its axis $x$—$x$. The lower bearing 36 is equipped with a spur gear 8 which meshes with a spur gear 9 of smaller diameter, 10 is a pinion on the shaft of spur gear 9, and 11 is a spur gear on a downward extension 7 of the gun mount 23 which pinion meshes with the pinion 10. By these means the gun mount 7, 23 and the gun 6 are turned about the axis z—z when the cabin 1 turns about its axis x—x, and the gun is deflected as required.

Elevation is imparted to the gun 6 by a hand wheel 12 in the cabin, bevel gearing 14, a vertical shaft which is arranged in the axis x—x and projects through a packing 13 at the bottom of the cabin, worm gear 15, a horizontal shaft 16 which is rotated by the worm gear 15, worm gear 17, a vertical shaft 18 arranged centrally in the extension 7 of the gun mount 23 and operatively connected to the worm gear 17, worm gear and pinion 19, 20, and a sector 21 on the trunnions of the machine gun 6.

Sighting is effected by separate sighting means (not shown) which are old in the art. Such sighting means are arranged in the cabin 1 and connected to the means for deflecting and elevating the gun 6 by mechanical, hydraulic or electric means (not shown) so as to move in unison with the gun as it is pointed by the movement of the cabin 1 and the hand wheel 12.

Figs. 3 and 4 illustrate a somewhat simplified equipment which is generally designed on the lines of that shown in Figs. 1 and 2, but the machine gun is here mounted on a bracket 22 of the cabin 1 so that the gearing by which the cabin 1 is connected to the gun mount 7, 23, is dispensed with and the gun mount 23 is fixed on the bracket 22. The cabin has only the bearing 28 for turning it about the vertical axis x—x and the pinion 4 is rotated from the crank 3 through bevel gearings 24, 25 and a vertical shaft. Elevation is effected by the hand wheel 12, as described, but the elevation gear is also simplified, 29, 30 being a spur gear and a pinion, respectively, on the shaft of the hand wheel 12 and a horizontal shaft 31 in the bracket 22, and 32 being a worm gear on the front end of the shaft 31 for rotating the pinion 20 which turns the sector 21 for elevating the gun.

In Figs. 5 and 6 the cabin 1 is mounted in two bearings 28 and 36, and turned about its vertical axis x—x by the crank 3 in the manner described with reference to Figs. 1 and 2, but here the cabin has a reduced top member 35 for the reception of the gunner's head with the window 2, and the gun mount 23 is arranged on the top of the cabin, at the left of the top member 35. A deflection gear is not required as the gun 6, like that in Figs. 3 and 4, turns with the cabin. The shaft 31 of the elevation gear is vertical and connected to the hand wheel 12 by bevel gearing 40. The upper end of the shaft 31 projects from the top of the cabin in front of the top member 35, obviously through a packing (not shown), and 42 is a horizontal shaft above the top of the cabin, with a worm gear 32, 41 at one end for cooperation with the shaft 31, and the pinion 20 at the other end of the shaft 42 for operating the sector 21.

An equipment in which the gun 6 has the usual sighting means will now be described with reference to Figs. 7 and 8. Here the cabin is mounted to turn about a vertical axis x—x and about a horizontal axis y—y. The cabin 1, which may be equipped with the top member 35, as shown, with the window 2, is mounted to rock about its horizontal axis y—y in bearings 39 which support suitable trunnions on the cabin. The bearings 39 are arranged at the upper ends of two uprights 38. 51 is a turntable on which the uprights are mounted, and 37 is a foundation plate on which the turntable 51 is mounted. A rack 45 at the back of the cabin 1 is curved to an arc of a circle about the axis y—y, 46 is a worm meshing with the rack 45, and 47 is an electric motor on the turntable 51 for rotating the worm 46. A worm 53 with another electric motor (not shown) serves for turning the turntable 51 about the vertical axis x—x, 52 being a worm wheel on the perimeter of the turntable 51.

The motor 47 and the motor (not shown) for rotating the worm 53 are operated by a pedal switch 48, 49 and 50 being contacts adapted to be engaged alternately by the two arms of switch 48. The gun mount 23 is secured on a bracket 22 as described with reference to Figs. 3 and 4. The trigger of the gun 6 is within reach of the gunner so that he can operate the gun directly through suitable bellows 55 which prevent leakage of air from the cabin 1. The gun is deflected and elevated by operating the switch 48, and the final elevation is given with a sight 56 in the usual manner. If desired the mount 23 may be rotatable in the bracket 22 as shown in Figs. 1 and 2, so that the gun can also be finally deflected by means of the sight 56.

I wish it to be understood that I do not desire to be limited to the exact details of construction shown and described for obvious modifications will occur to a person skilled in the art.

I claim:—

1. A fire-arm equipment for aircraft comprising an air-tight cabin movable relative to the craft for the accommodation of a gunner, a fire arm arranged outside said cabin, means adapted to be actuated by the gunner from within the cabin for moving the cabin, means operatively connected to said cabin-moving means for moving the gun in conformity with the movement of the cabin, and means adapted to be actuated by the gunner from within the cabin for moving the gun independently of said cabin-moving means.

2. A fire-arm equipment for aircraft comprising an air-tight cabin movable relative to the craft for the accommodation of a gunner, a fire arm arranged outside said cabin but connected to the cabin so as to move in unison with the cabin, means adapted to be actuated by the gunner from within the cabin for moving the cabin and the gun and means adapted to be actuated by the gunner from within the cabin for moving the gun independently of said cabin-moving means.

3. A fire-arm equipment for aircraft comprising an airtight cabin movable relative to the craft for the accommodation of a gunner, a gun-mount fixed to the outer wall of said cabin, a fire-arm arranged on said mount, means adapted to be actuated by the gunner from within the cabin for moving said cabin and said mount and means in said cabin for varying the elevation of said fire-arm.

4. A fire-arm equipment for aircraft comprising an air-tight cabin for the accommodation of a gunner movable relative to the craft, a gun-mount fixed to the outer wall of said cabin, a fire-arm arranged on said mount outside of and sideways of the top part of said cabin, means adapted to be actuated by the gunner from within the cabin for moving the cabin and said mount and means in said cabin for varying the elevation of said fire-arm.

5. A fire-arm equipment for aircraft comprising a movable air-tight cabin for the accommodation of a gunner, a fire arm arranged outside said cabin, means extending air-tightly through the wall of the cabin and adapted to be actuated by the gunner from within the cabin for moving the cabin, and means also extending airtightly through the wall of the cabin and operatively connected to said cabin-moving means for moving the gun in conformity with the movement of the cabin.

6. A fire-arm equipment for aircraft comprising an air-tight cabin mounted to turn about a vertical axis and adapted to accommodate a gunner, a fire arm arranged outside said cabin, means adapted to be actuated by the gunner from within the cabin for turning the cabin about its vertical axis, and means operatively connected to said cabin-turning means for moving the gun in conformity with the movement of the cabin.

7. A fire-arm equipment for aircraft comprising an air-tight cabin mounted to turn about a horizontal axis and adapted to accommodate a gunner, a fire arm arranged outside said cabin, means adapted to be actuated by the gunner from within the cabin for turning the cabin about its horizontal axis, and means operatively connected to said cabin-turning means for moving the gun in conformity with the movement of the cabin.

8. A fire-arm equipment for aircraft, comprising an air-tight cabin mounted to turn about a vertical and a horizontal axis and adapted to accommodate a gunner, a fire arm arranged outside said cabin, means adapted to be actuated by the gunner from within the cabin for turning the cabin about its axes, and means operatively connected to said cabin-turning means for moving the gun in conformity with the movement of the cabin.

9. A fire-arm equipment for aircraft comprising an air-tight cabin mounted to turn about a vertical and a horizontal axis and adapted to accommodate a gunner, a fire arm arranged outside said cabin, means adapted to be actuated by the gunner from within the cabin for turning the cabin about its axes, means operatively connected to said cabin-turning means for moving the gun in conformity with the movement of the cabin, a sight on said gun, said gun having its operating means within reach of the gunner and being adapted to be pointed by the gunner independently of said cabin-moving means, and an air-tight member connecting the portion of the fire arm where said operating means are positioned, to the interior of the cabin.

10. A fire-arm equipment for aircraft comprising an air-tight cabin mounted to turn about a vertical axis and adapted to accommodate a gunner, a gun mount adapted to turn about a vertical axis outside said cabin, a fire arm in said mount, means adapted to be actuated by the gunner from within the cabin for turning the cabin about its vertical axis, and means operatively connected to said cabin-turning means for turning the gun about its vertical axis in conformity with the movement of the cabin.

ERNST ZINDEL.